United States Patent [19]

Fowlkes

[11] Patent Number: 5,723,922
[45] Date of Patent: Mar. 3, 1998

[54] COMPRESSOR OVERLOAD HOLDER AND METHOD OF MOUNTING SAME

[75] Inventor: Jeffrey C. Fowlkes, Springville, Tenn.

[73] Assignee: Tecumseh Products, Tecumseh, Mich.

[21] Appl. No.: 687,760

[22] Filed: Jul. 26, 1996

Related U.S. Application Data

[63] Continuation-in-part of Ser. No. 249,532, May 26, 1994, abandoned.

[51] Int. Cl.$^6$ ............................................... H02K 11/00
[52] U.S. Cl. ............................................... 310/68 C
[58] Field of Search ............................. 310/68 C, 68 R; 174/138 G; 361/807, 820

[56] References Cited

U.S. PATENT DOCUMENTS

| | | | |
|---|---|---|---|
| 2,523,059 | 9/1950 | Richert | 310/68 C |
| 3,131,322 | 4/1964 | Pleiss | 310/68 C |
| 3,181,974 | 5/1965 | Barbera | 174/138 G |
| 3,483,392 | 12/1969 | Schuler | 174/138 G |
| 3,875,439 | 4/1975 | Roach | 310/68 C |
| 4,028,570 | 6/1977 | Kieffer | 310/68 C |
| 4,061,935 | 12/1977 | Kandpal | 310/68 C |
| 4,163,913 | 8/1979 | Barratt | 310/68 C |
| 4,188,553 | 2/1980 | Wheaton | 310/68 C |
| 4,250,419 | 2/1981 | Zolman | 310/68 C |
| 4,328,438 | 5/1982 | Zolman | 310/68 C |
| 4,503,347 | 3/1985 | Bergman | 310/68 C |
| 4,567,390 | 1/1986 | Stewart | 310/68 C |
| 4,667,270 | 5/1987 | Yagi | 361/820 |
| 4,734,602 | 3/1988 | Hauser | 310/68 C |
| 5,117,330 | 5/1992 | Miazga | 174/138 C |

FOREIGN PATENT DOCUMENTS 10198244 8/1989 Japan.

Primary Examiner—Clayton E. Laballe
Attorney, Agent, or Firm—Baker & Daniels

[57] ABSTRACT

An overload holder for mounting a thermal overload protector to the compressor motor of a hermetically sealed compressor unit. The holder includes an insulative plastic circumferential wall with openings at the top and bottom thereof, an arm extending outwardly therefrom, and a lip extending inwardly therefrom. Electrical leads extend from the overload protector, through the overload holder, and connect to the motor. The lip engages the overload protector so that the overload protector is held in place in the holder. The holder attaches to the stator by engaging the lacing about the stator windings at the outwardly extending arm and the exposed electrical leads, which are generally opposite the outwardly extending arm.

41 Claims, 5 Drawing Sheets

COMPRESSOR OVERLOAD HOLDER AND METHOD OF MOUNTING SAME

CROSS REFERENCE TO RELATED APPLICATIONS

This is a continuation-in-part of application Ser. No. 08/249,532 filed May 26, 1994, now abandoned.

BACKGROUND OF THE INVENTION

The invention relates to a hermetic compressor and in particular to a compressor having an internal motor overload protector, which is attached to the motor windings.

In hermetic compressors, a motor-compressor assembly is disposed within a housing, the assembly having an electric motor drivingly connected to the compressor unit. Normally, a motor overload protector is disposed in thermal contact and in electrical connection with the motor windings, to prevent damage to the motor in the event of overheating or an overcurrent condition.

Prior art hermetic compressors, such as shown in U.S. Pat. No. 4,734,602 to Hauser, have previously utilized a motor protector holder attached to the stator by one of the stator bolts, to which attaches an overload protector. U.S. Pat. No. 4,567,390 also discloses a type of overload holder which is attached by bolts to the stator.

These overload holders, attached to the motor by bolts, increase the cost of manufacturing the compressor by increasing the labor necessary to install the holder and protector. Further, these holders include more parts than necessary thereby increasing the total cost of the compressor.

Additionally, U.S. Pat. Nos. 4,328,438 and 4,250,419 disclose alternate overload holders made from sheets of dielectric material, such as MYLAR. The holder is created by folding the sheet of material upon itself to form a locking flap and shoulder creating a pocket. The holder assembly is laced with the main windings of the stator and the motor protector is inserted into the pocket.

What is needed is an inexpensive, easily constructed overload protector holder, having fewer parts than prior motor protector holders.

SUMMARY OF THE INVENTION

In one embodiment the present invention overcomes the problems and disadvantages of the prior art by providing an improved motor protector holder to which a motor protector may lockingly attach during compressor assembly. The insulative holder attaches directly to the stator windings and receives the motor protector in a snap-lock fashion.

Generally, the invention provides an injection molded, insulative motor protector holder which attaches to the lacings of the stator core windings. In one form, tabs extend from the base of the holder and are engaged by the lacing about the stator windings, thereby securely attaching the holder to the stator. More specifically, the invention provides a plurality of upstanding resilient legs on the holder base encircling a containment area, each leg including a shoulder that locks over an edge of the motor protector. The legs flex to permit the insertion and snap locking of the motor protector to the holder.

In a second form of the invention, one tab extends from the base or wall of the holder in a direction generally opposite the direction in which the electrical leads of the protector project. The single tab on one side of the holder and the electrical leads on the opposite side are engaged by the stator lacing and thereby secure the holder to the motor. In this second embodiment a lip is provided at least partially about the inner circumference of the holder base/wall to engage the upper surface of the motor protector and thereby hold same in place when secured to the windings by the winding lacing.

An advantage of the overload holder of the present invention is that of eliminating additional insulation presently used to insulate between the motor protector and the stator windings. By forming of the holder out of an insulative plastic, a significant cost savings can be realized.

Another advantage of the overload holder of the present invention is that the holder may be installed after the stator is varnished, thereby assuring an insulative barrier between the motor overload protector and the stator windings.

A further advantage of the overload holder of the present invention is that the snap locking legs increase the ease of manufacture of the compressor, particularly of attachment of the motor protector to the stator. Once the protector is locked into place by the resilient legs, extraordinary effort is needed to remove the protector without breaking the holder.

Yet another advantage of the overload holder of the present invention is that the large side tabs enhance its ability to be handled by factory workers and furthermore creates a large attachment portion to which the stator lacings attach.

A further advantage of the overload holder of the present invention is the simplicity in the design whereby a single arm may be used in conjunction with the electrical leads of the overload protector to secure the overload protector and holder combination to the motor by engaging the lacing which wraps the stator windings. This simplifies manufacturing and decreases the cost of manufacturing.

The invention, in one form thereof, provides a compressor in which a motor compressor unit having a motor with windings wrapped by lacing is disposed in a housing. A motor overload or temperature protector is electrically connected to the motor. An insulative overload holder for mounting the motor protector to the motor includes a base with an upstanding resilient leg extending therefrom, with the leg adapted to snap lock about the motor protector. A tab extends from the base of the overload holder and is held to the motor by the winding lacings.

The invention, also provides a motor compressor unit having a motor with windings wrapped by lacing. The motor compressor unit disposed within the housing and an overload protector electrically connected to the motor compressor unit. An insulative overload protector holder includes a base having a plurality of upstanding resilient legs, each leg having a shoulder to snap lock the overload protector to the holder. Two tabs extend from opposite sides of the overload protector and are between the motor windings and lacing for attachment of the holder to the motor.

In an alternative embodiment, the invention provides a compressor having a motor compressor unit, an overload protector, and an overload holder. The motor compressor unit includes a motor with windings wrapped by lacing. The overload protector is electrically connected to the motor by electrical leads. The overload holder is used to mount the overload protector to the motor and includes a wall having a lower end which defines an opening for receiving the overload protector whereby the wall may surround the overload protector. A lip is provided which extends inwardly from the wall and engages the overload protector. The overload protector is positioned to maintain thermal contact with the motor. A recess is provided to partially receive the electrical leads of the overload protector and an arm extends outwardly from the wall. Lacing engages the arm and the electrical leads, which are generally directed opposite the arm, and thereby securely attaches the overload protector and holder to the motor.

In a further form, the present invention provides a method of mounting an overload protector to a motor in a compressor. The compressor includes a motor having a stator with windings wrapped by lacing. The overload protector is held in place by an overload holder which is generally hollow and which comprises a circumferential wall with openings at the top and bottom thereof. An arm extends outwardly away from the wall and a lip extends inwardly from the wall. Electrical leads which extend from the overload protector are passed through the bottom and out through the top of the overload holder in a direction generally opposite the arm so that the leads hang out from the top of the holder. The overload protector is disposed in the overload holder so that the wall surrounds and the lip engages the overload protector. The overload protector and holder combination is positioned adjacent the motor such that the overload protector makes thermal contact with the motor and the electrical leads rest in a recess which is provided in the top of the overload holder. The overload protector is electrically connected to the motor by the electrical leads. Lacing is wrapped about the motor windings with the overload protector and holder in place so that the lacing engages the outwardly extending arm and the exposed electrical leads. In this manner the overload protector and holder combination is securely attached to the motor.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
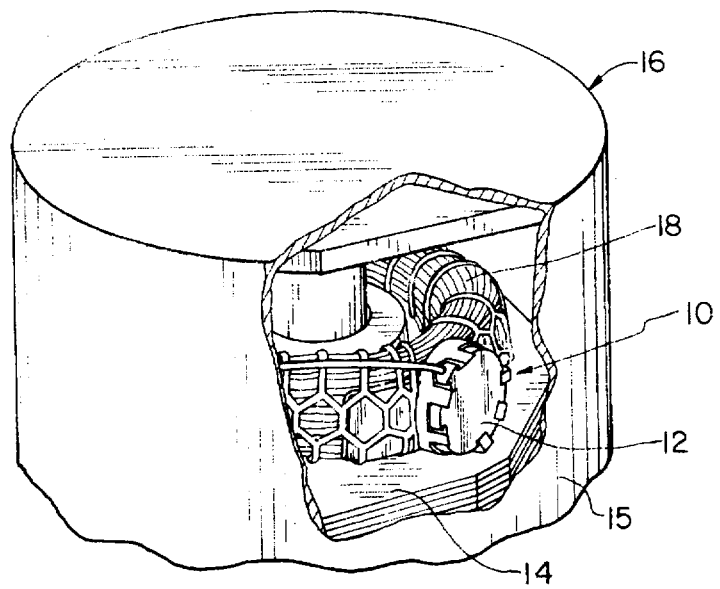
FIG. 1 is a perspective view, partially broken away, showing a hermetically sealed compressor in which the overload holder of one form of the present invention is shown attached to the stator windings.

Referring now to the drawings and particularly to FIG. 1, one embodiment of the mounting apparatus or overload holder 10 provided by the present invention is shown as mounting a thermal overload protector 12 to the compressor motor 14 of a hermetically sealed compressor unit 16. Holder 10 is mounted to a portion of stator windings 18 by means of a polyester lacing 20. This lacing 20 is known in the art and previously has been used to maintain stator windings 18 together. A typical compressor to which holder 10 may be connected in may be found in, for example, U.S. Pat. No. 4,846,635, assigned to the assignee of the present invention and incorporated herein by reference. No limitation is intended to the type of compressor in which holder 10 may be utilized.

Figure 7:
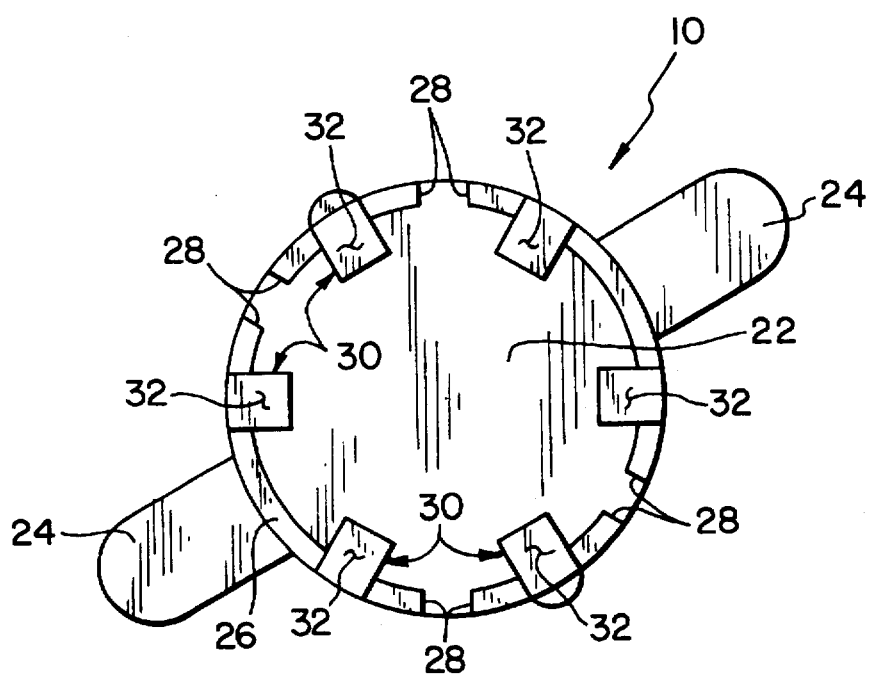
FIG. 7 is a top plan view of the present invention.

Now referring to FIGS. 4–7, overload holder 10 includes a base 22 comprising a one piece unit having two rounded projecting tabs 24. Tabs 24 extend from opposite sides of the base 22 as best seen in FIG. 7. Alternatively, base 22 may have one or a plurality of tabs 24 to securely attach holder 10 to stator windings 18.

Holder 10 includes an upstanding ring portion 26 with a number of cutouts 28. These cutouts 28 permit a reduction of cost in holder 10, by reducing the amount of material necessary for manufacture.

Figure 4:
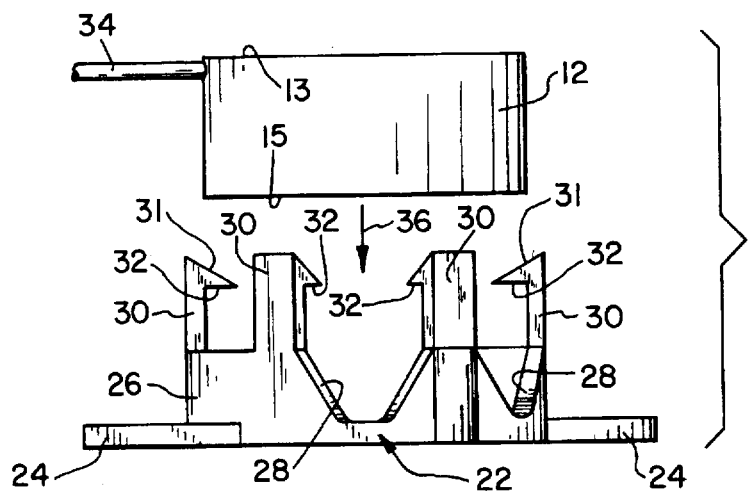
FIG. 4 is an elevational view of one form of the present invention prior to motor protector attachment.

From base 22 and ring portion 26 extends at least one upstanding resilient leg 30. As shown in FIG. 4, each leg includes a shoulder 32. Holder 10, in the illustrated example, is in the form of a receptacle, open at one end to receive therein a selected overload protector 12 (FIG. 4).

The motor overload protector of the drawings is of a generally cylindrical configuration as is known in the art, for instance, the 32 HM overload manufactured by Texas Instruments, Inc. of Attleboro, Mass. As shown in FIG. 4, motor protector 12 includes electrical leads 34 that connect between the compressor motor windings and the electrical terminal (not shown).

During compressor assembly, holder 10 is inserted into lacings 20 of motor 14. The relative large size of tabs 24 permit ease of weaving the tabs beneath lacing 20 by factory personnel. For further ease, the distal ends of each tab 24 are smooth and curved.

Figure 2:
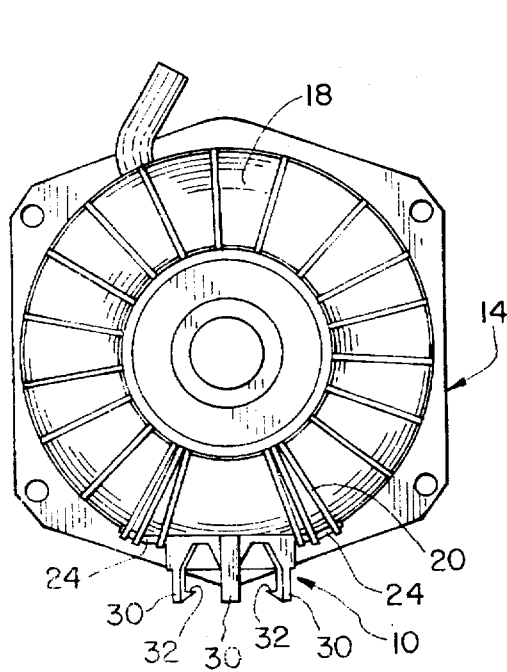
FIG. 2 is a top view of the motor disposed within the compressor of FIG. 1.
Figure 3:
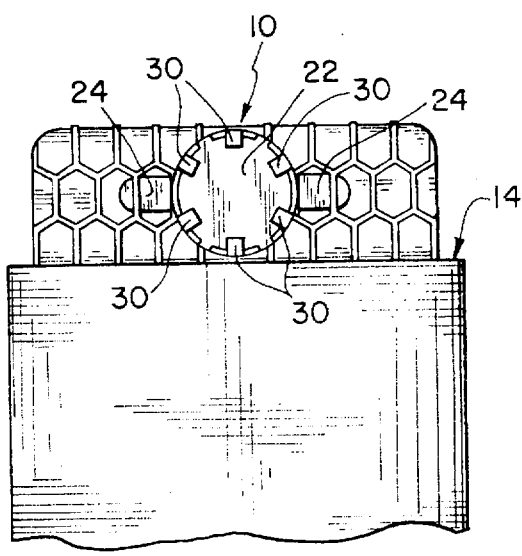
FIG. 3 is an elevational view of the motor of FIG. 2.

As shown in FIGS. 1–3, tabs 24 are held to winding 18 by means of polyester lacing 20. For normal attachment, each tab 14 is weaved beneath at least one, but preferably a plurality of lacings to secure holder 10 to windings 18. In both FIGS. 2 and 3, holder 10 is shown, without an inserted overload protector 12.

Overload protector 12 is quickly inserted and locked into the area between legs 30 and ring portion 26. As protector 12 is pushed into contact with holder 10, in the direction shown by arrow 36 (FIG. 4), eventually shoulder 32 on legs 30 will engage and snap over the top edge 13 of protector 12 thereby firmly retaining and locking protector 12 within holder 10.

Figure 5:
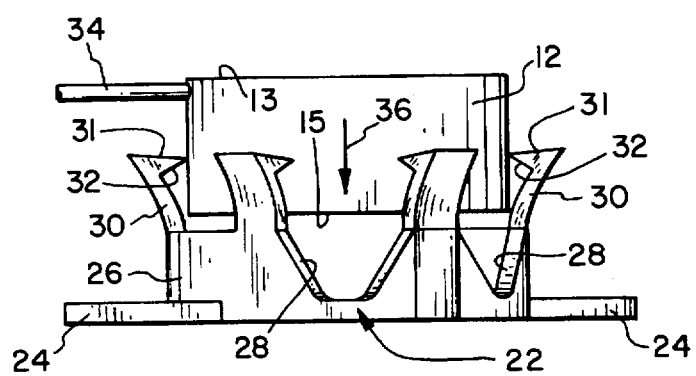
FIG. 5 is an elevational view of one form of the present invention shown with the motor protector partially inserted.
Figure 6:
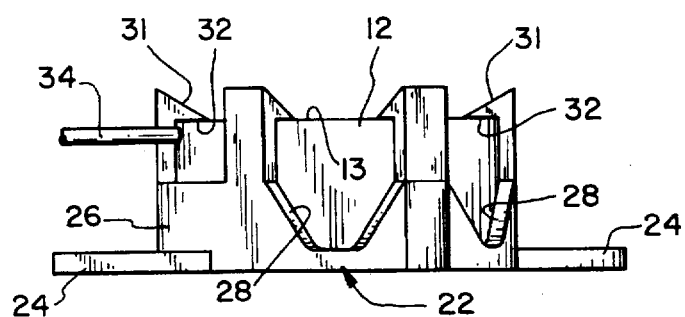
FIG. 6 is an elevational view of one form of the present invention after motor protector attachment.

More specifically, each leg 30 includes a top inclined surface 31, inclined inward toward base 22. Inclined surface 31 serves two purposes. The first purpose is to help center protector 12 to holder 10 while the second is to assist in the initial backward bending or flexing of legs 30. During insertion of protector 12, bottom edge 15 initially contacts inclined surface 31. As protector 12 continues to travel in the direction of arrow 36, edge 15 interacts with inclined surface 31 causing legs to resiliently flex backward as shown in FIG. 5. Protector 12 slides between legs 30 until top edge 13 passes the edge of inclined surface 31. At this instant, legs 30 suddenly snap back to their normal upright position. Shoulder 32, located under inclined surface 31, then overlies top edge 13. This structure effectively "snap locks" protector 12 to holder 10. For proper attachment and safety, a plurality of resistant legs 30 are formed on base 22 to capture and encircle protector 12. Alternatively, in other designs, it may be possible to use only one leg 30 if other methods to prevent movement of protector 12 are included, such as ring portion 26.

Holder 10 is constructed from a thermoplastic polyester material made from, for example, polybutane terephthalate molding resin although other material may be used. Known methods of injection molding are used in the construction of holder 10. The invention maintains the necessary electrical clearance (i.e. the electrical breakdown distance) between overload protector 12 and stator windings 18.

The overload protector mounting holder 10 thus far described in connection with FIGS. 1–7 has several significant advantages. For example, when holder 10 is fabricated of a relatively inexpensive plastic insulating material such as VALOX, elimination of extra electrical insulation is possible. Furthermore, the mounting apparatus provided by the present invention is found to be economical both in fabrication and assembly, and also lends itself to rapid and economic repair both in the factory and in the field.

Although the mounting apparatus provided by the present invention has been described in connection with a specific embodiment thereof, it will be evident that for compressor assemblies and/or for overload protectors of different configurations, sizes or shapes a modified holder may be provided.

Figure 8A:
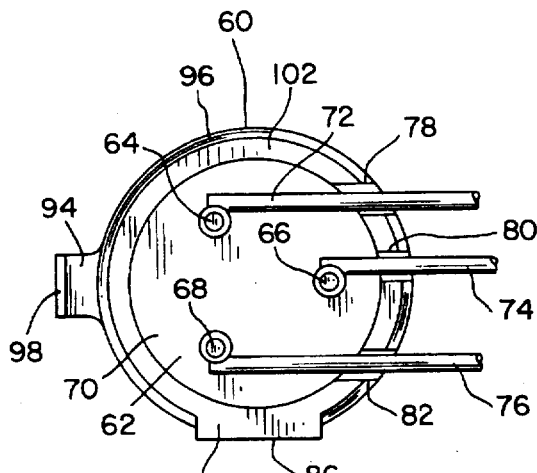
FIG. 8A is a top plan view of an alternative embodiment overload protector holder of the present invention.
Figure 8B:
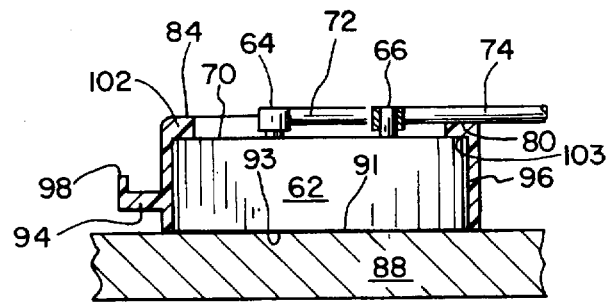
FIG. 8B is a side-sectional view of the overload holder of FIG. 8A.

FIG. 8A illustrates an alternative embodiment of the overload holder of the present invention. Overload holder 60 is shown being generally cylindrical. However, it should be understood that the shape of the holder may conform to the shape, which may be other than cylindrical, of the overload protector that it receives. Overload protector 62 is shown disposed in overload holder 60 in FIGS. 8A and 8B. Terminals 64, 66, and 68 are shown extending from top surface 70 of holder 60.

Figure 11:
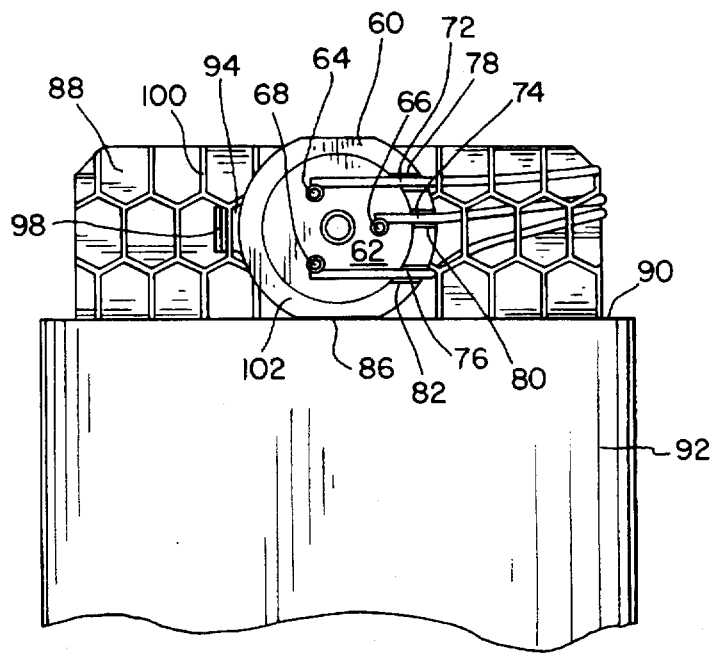
FIG. 11 is an elevational view of the stator of FIG. 10.

Electrical leads 72, 74, and 76 are connected to terminals 64, 66, and 68 and are received in recesses 78, 80, and 82, which are shown formed in top surface 84 of holder 60. The recesses help hold the electrical leads in place and provide an indication of proper orientation during production. The recesses also help maintain the leads in a lower profile to prevent unnecessary exposure to mechanical parts which could result in excessive and premature wear. The recesses are generally placed opposite outwardly extending arm 94. By having arm 94 and at least one of the electrical leads extend outwardly away from the holder, the retaining forces exerted by motor lacing 100 are more evenly balanced across holder 60. In this manner, the holder is most effectively secured against the outer surface of stator windings 88. A flat surface 86 may be provided on one side of holder 60 so that with holder 60 mounted against stator windings 88, as shown in FIG. 11, flat surface 86 abuts surface 90 associated with stator laminate 92. With flat surface 86 squarely abutting laminate 92, holder 60 is locked against rotational type movements and will be more securely attached to the windings.

Arm 94 extends outwardly from annular wall 96 of holder 60 and includes an up-raised tab 98 which extends perpendicular to arm 94 and parallel with wall 96, thereby forming a U-shaped channel for receiving stator winding lacing 100. With stator winding lacing 100 wrapped about stator windings 88, lacing 100 engages holder arm 94 and electrical leads 72, 74, 76 so as to secure holder 60 and overload protector 62 snugly against stator windings 88. In this manner lower surface 93 of overload protector 62 is maintained in thermal contact with outer surface 91 of stator windings 88 for purposes of detecting an overload condition. Arm 94, flat surface 86, and recesses 78, 80, 82 are designed to most effectively secure holder 60 and overload protector 62 to windings 88 in such a manner that little movement occurs.

Figure 9A:
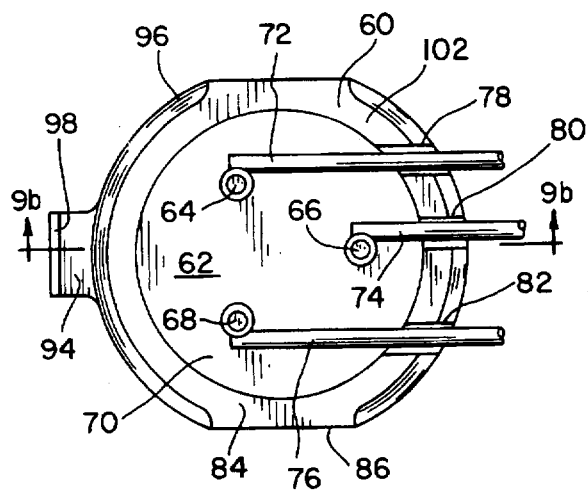
FIG. 9A is a top plan view of a second alternative embodiment of the overload holder of the present invention.
Figure 9B:
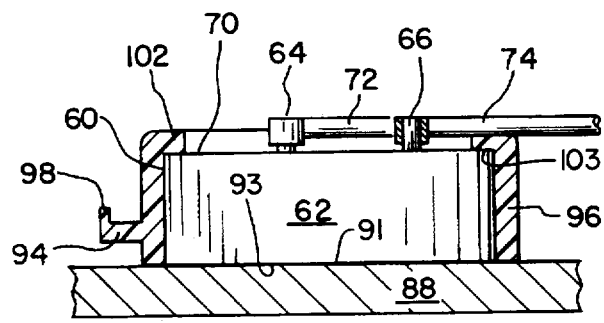
FIG. 9B is a side-sectional view of the overload holder of FIG. 9A.

FIGS. 9A and 9B illustrate a second alternative embodiment of the overload holder described above. As with the holder of FIGS. 8A and 8B, holder 60 is provided with an annular lip 102 which extends radially inwardly from annular circumferential wall 96 so as to form a ledge, bottom surface 103 of which engages upper surface 70 of overload protector 62 so as to prevent overload protector 62 from passing through the top of holder 60. The alternative embodiment of FIGS. 9A and 9B is provided with a second flat surface along wall 96 directly opposite flat surface 86. This permits overload protector 62 to be positioned in either of two positions, 180 degrees apart, with either of the two flat surfaces abutting surface 91 of stator laminate 92.

Figure 10:
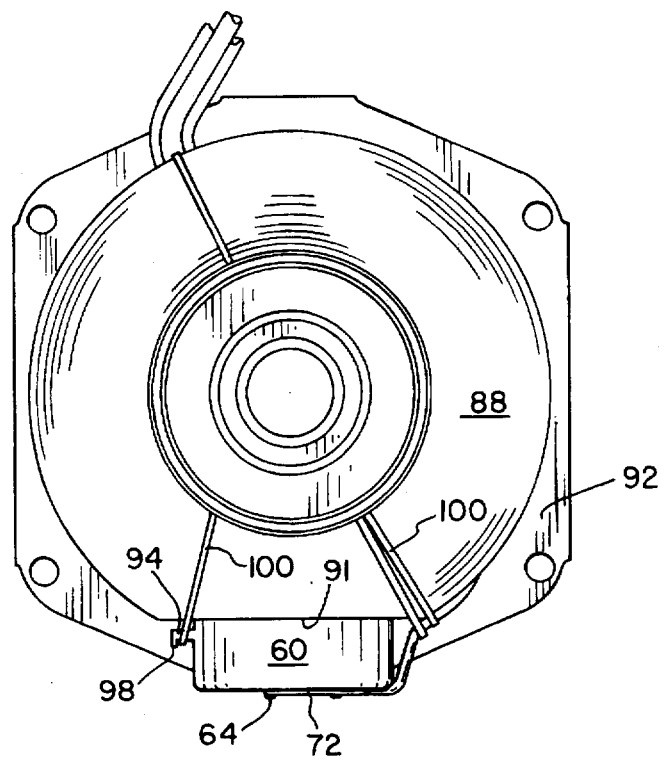
FIG. 10 is a top view of the stator to be disposed within the compressor of a FIG. 1 having the alternative embodiment of the present invention as shown in FIGS. 9A and 9B.

FIGS. 10 and 11 illustrate a conventional stator incorporating the above-described alternative embodiment overload protector and holder combination of FIGS. 9A and 9B.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A compressor comprising:

a housing;

a motor-compressor unit including a motor with windings wrapped by lacing, said unit disposed in said housing;

an overload protector electrically connected to said motor by at least one electrical lead, said electrical lead extending in a first direction; and an overload holder for mounting said overload protector to said motor, said holder comprising:

a wall having a first opening proximate said motor windings and a second opening, said wall surrounding said overload protector, said overload protector having a first surface in direct thermal contact with said motor windings through said first opening, said at least one electrical lead being connected to said overload protector via said second opening;

at least one lip extending inwardly from said wall and engaging said overload protector; and an arm extending outwardly from said wall in a second direction generally opposite said first direction of said electrical lead, said lacing engaging said arm and said electrical leads, whereby said overload holder and said overload protector are affixed to said motor by said lacing.

2. The compressor of claim 1 in which said overload protector is generally cylindrical and said overload holder is at least partially tubular.

3. The compressor of claim 1 in which said overload holder is formed of plastic.

4. The compressor of claim 1 in which said overload holder further comprises a circumferential lip extending inwardly from said wall and engaging said overload protector.

5. The compressor of claim 1 in which said lip defines an upper surface of said overload holder and a recess is formed on said overload holder upper surface, said electrical lead being at least partially disposed in said recess.

6. The compressor of claim 5 in which said overload protector further comprises a plurality of said electrical leads extending in said first direction, said overload holder further comprises a plurality of said recesses, and each of said plurality of recesses receives one of said plurality of electrical leads.

7. The compressor of claim 1 in which said wall has at least one flat surface, said motor has a stator, and said flat surface abuts said stator.

8. The compressor of claim 1 in which said overload holder further comprises a recess at least partially receiving said electrical lead.

9. The compressor of claim 1 in which said overload protector further comprises a plurality of electrical leads, at least one of said plurality of electrical leads extending in said first direction.

10. The compressor of claim 8 in which said overload holder further comprises a plurality of said recesses and each of said plurality of recesses receives one of said electrical leads.

11. The compressor of claim 1 in which said overload holder is formed of a dielectric material.

12. The compressor of claim 1 in which said overload holder further comprises a tab which extends upwardly from said arm in a direction away from said motor, and in which said wall, said arm, and said tab form a channel for receiving said lacing.

13. A motor comprising:
   a stator having windings wrapped by lacing;
   an overload protector electrically connected to said motor by an electrical lead extending in a first direction; and
   an overload protector holder comprising:
      a wall defining an opening for receiving said overload protector, said wall surrounding said overload protector;
      a lip extending inwardly from said wall and engaging said overload protector, said overload protector in thermal contact with said motor; and
      an arm extending outwardly from said wall in a direction generally opposite said first direction and having an upraised tab, said wall, said arm, and said tab forming a channel receiving said lacing, whereby said overload holder and said overload protector are affixed to said motor by said lacing.

14. The compressor of claim 13 in which said overload holder is formed of a dielectric material.

15. The compressor of claim 13 in which said overload holder is formed of plastic.

16. The holder of claim 13 in which said overload holder further comprises a tab which extends upwardly from said arm in a direction away from said motor, whereby said wall, said arm, and said tab form a channel for receiving said lacing.

17. The compressor of claim 13 in which said wall is substantially tubular.

18. The compressor of claim 13 in which said overload holder further comprises a circumferential lip extending inwardly from said wall and engaging said overload protector.

19. The compressor of claim 13 in which said overload holder further comprises a recess at a position generally opposite said arm and for at least partially receiving said electrical lead.

20. The holder of claim 19 in which said lip defines an upper surface of said overload holder and said recess is formed on said overload holder upper surface.

21. A method of mounting an overload protector to a motor in a compressor, wherein the motor includes a stator having windings wrapped by lacing, and the overload protector is received in an overload holder which is generally hollow and which comprises a wall with openings at the top and bottom, an arm extending outwardly away from the wall, and a lip extending inwardly from the wall, the method of mounting comprising the steps of:
   passing an electrical lead which extends from the overload protector through the bottom and top openings of the overload holder such that the leads hang out from the top of the overload holder;
   inserting the overload protector in the overload holder such that the wall surrounds the overload protector and the lip engages the overload protector;
   positioning the overload protector and holder adjacent the motor such that the overload protector makes thermal contact with the motor through the opening at the bottom of the holder and the electrical lead is directed generally laterally away from the arm and rests upon the top of the overload holder;
   electrically connecting the overload protector to the motor by the electrical lead; and
   wrapping the lacing about the stator windings such that the lacing engages the outwardly extending arm and the exposed electrical lead so as to secure the overload holder and the overload protector snugly against the motor.

22. The method of claim 21 in which the holder includes a recess located generally opposite the arm and at the top of the holder, and in which the step of positioning the overload protector includes positioning the electrical lead in the recess.

23. The method of claim 21 in which the wall is generally tubular and the overload protector is generally cylindrical.

24. A compressor comprising:
   a housing;
   a motor-compressor unit including a motor with windings wrapped by lacing, said unit disposed in said housing;
   a motor protector electrically connected to said motor via at least one electrical lead; and
   an overload holder for mounting said motor protector to said motor, said holder and said motor protector being external and adjacent said windings and comprising:
      a base having a first opening proximate said motor windings and a second opening, said base at least partially surrounding said overload protector, said overload protector having a first surface in direct thermal contact with said motor windings through said first opening, said at least one electrical lead being connected to said overload protector via said second opening;

an upstanding resilient leg extending from said base, said leg adapted to snap lock about said motor protector; and a tab extending from said base, said tab being held to said motor by said lacings.

25. The compressor of claim 24 in which said upstanding leg includes a shoulder, said shoulder adapted to snap lock about the motor protector.

26. The compressor of claim 24 in which said holder is formed of plastic.

27. The compressor of claim 24 includes a plurality of tabs for attachment of said holder to the motor lacings, said plurality of tabs being external and adjacent said windings.

28. The compressor of claim 24 in which said holder is formed of a dielectric material.

29. The compressor of claim 24 in which said holder further comprises a plurality of upstanding legs evenly spaced about the perimeter of said base to encircle said motor protector when said motor protector is mounted within said holder.

30. The compressor of claim 29 in which each of said legs includes a top surface sloped downward toward said base, said top surface causing said legs to flex away from said motor protector when said motor protector initially engages said holder.

31. The compressor of claim 24 in which said leg includes a top surface sloped downward toward said base, said top surface causing said leg to flex away from said motor protector when said motor protector initially engages said holder.

32. A compressor comprising:

a housing;

a motor-compressor unit including a motor including a stator having windings wrapped by lacing, said unit disposed in said housing;

an overload protector electrically connected to said motor by at least one electrical lead; and an overload protector holder, said overload protector and said holder being external and adjacent said windings, said holder comprising:

a base having a wall partially encircling said overload protector to prevent lateral movement of said overload protector, said wall having a first opening proximate said motor windings and a second opening, said overload protector having a first surface in direct thermal contact with said motor windings through said first opening, said at least one electrical lead being connected to said overload protector via said second opening;

an upstanding resilient leg extending from said wall, said leg including a shoulder, said shoulder adapted to lock over said overload protector; and a tab extending from said base, said tab disposed between said windings and said lacings, said overload protector locked to said overload protector holder by said shoulder, said wall being intermediate said leg and said tab.

33. The compressor of claim 32 in which said holder is formed of a dielectric material.

34. The compressor of claim 32 in which said holder is formed of plastic.

35. The compressor of claim 32 in which said holder includes a plurality of tabs for attachment of said member to the motor lacings.

36. The holder of claim 32 in which said base is generally circular and further comprising a plurality of legs evenly spaced about the circumference of said wall to encircle said overload protector when the overload protector is locked to said holder.

37. The compressor of claim 36 in which each of said legs includes a top surface sloped downward toward said base, said top surfaces causing said legs to flex away from said overload protector when said overload protector initially engages said holder.

38. The compressor of claim 32 in which said leg includes a top surface sloped downward toward said base, said top surface causing said leg to flex away from said overload protector when said overload protector initially engages said holder.

39. A compressor comprising:

a housing;

a motor compressor unit having a motor with windings wrapped by lacing, said unit disposed in said housing;

an overload protector electrically connected to said motor-compressor unit by at least one electrical lead; and an insulative overload protector holder and said overload protector being external and adjacent said motor, said holder comprising:

a generally circular base having a plurality of upstanding resilient legs spaced about the circumference of said circular base, each said leg having a shoulder, said overload protector snap locked to said holder by said shoulder, said base having a first opening proximate the motor windings and a second opening, said overload protector having a first surface in thermal contact with said motor windings via said first opening, said at least one electrical lead being connected to said overload protector via said second opening; and two tabs extending from opposite sides of said base, said tabs disposed between said windings and said lacing.

40. The compressor of claim 39 in which said holder is formed of plastic.

41. The compressor of claim 39 in which each of said legs includes a top surface sloped downward toward said base, each said top surface causing each said leg to flex away from said overload protector when said overload protector initially engages said holder.

* * * * *